(12) United States Patent
Chang

(10) Patent No.: US 7,987,298 B2
(45) Date of Patent: Jul. 26, 2011

(54) SYSTEM AND METHOD FOR DETECTING THE STATUS OF A UNIVERSAL SERIAL BUS PORT OF A MOBILE PHONE

(75) Inventor: Chih-Chieh Chang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 109 days.

(21) Appl. No.: 12/567,869

(22) Filed: Sep. 28, 2009

(65) Prior Publication Data
US 2010/0228892 A1    Sep. 9, 2010

(30) Foreign Application Priority Data
Mar. 4, 2009    (CN) .......................... 2009 1 0300671

(51) Int. Cl.
*G06F 3/00*    (2006.01)
*G01R 19/00*    (2006.01)

(52) U.S. Cl. ............................ 710/19; 710/15; 324/76.11
(58) Field of Classification Search .................. None
See application file for complete search history.

(56) References Cited

U.S. PATENT DOCUMENTS

| 6,062,480 A * | 5/2000 | Evoy ............................ 235/492 |
| 6,182,173 B1 * | 1/2001 | Grosser et al. ................ 710/302 |
| 2008/0228969 A1 * | 9/2008 | Cheah et al. .................... 710/69 |

\* cited by examiner

*Primary Examiner* — Ilwoo Park
(74) *Attorney, Agent, or Firm* — Raymond J. Chew

(57) ABSTRACT

A system and method are provided for detecting connection status of a universal serial bus (USB) port of a mobile phone and a terminal device from among connecting, connected, disconnecting, or disconnected status. A voltage of the USB port is the same as a voltage of a charging interface of the mobile phone. The voltage of the charging interface is detected. The connection status of the mobile phone stored in a storage system is updated according to the voltage status of the charging interface.

10 Claims, 3 Drawing Sheets

SYSTEM AND METHOD FOR DETECTING THE STATUS OF A UNIVERSAL SERIAL BUS PORT OF A MOBILE PHONE

BACKGROUND

1. Technical Field

Embodiments of the present disclosure relate to detection systems and methods, and more particularly to a system and method for detecting the status of a universal serial bus port of a mobile phone.

2. Description of Related Art

Often, files are transmitted between a mobile phone and a computer via a universal serial bus (USB) port of the mobile phone. In such a case, the computer may not detect a connection status of the USB port correctly. Thus, the mobile phone may experience an error accordingly, and data from a memory card thereof may not be read correctly.

Therefore, an effective system and method is needed to overcome the described limitations.

DETAILED DESCRIPTION

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
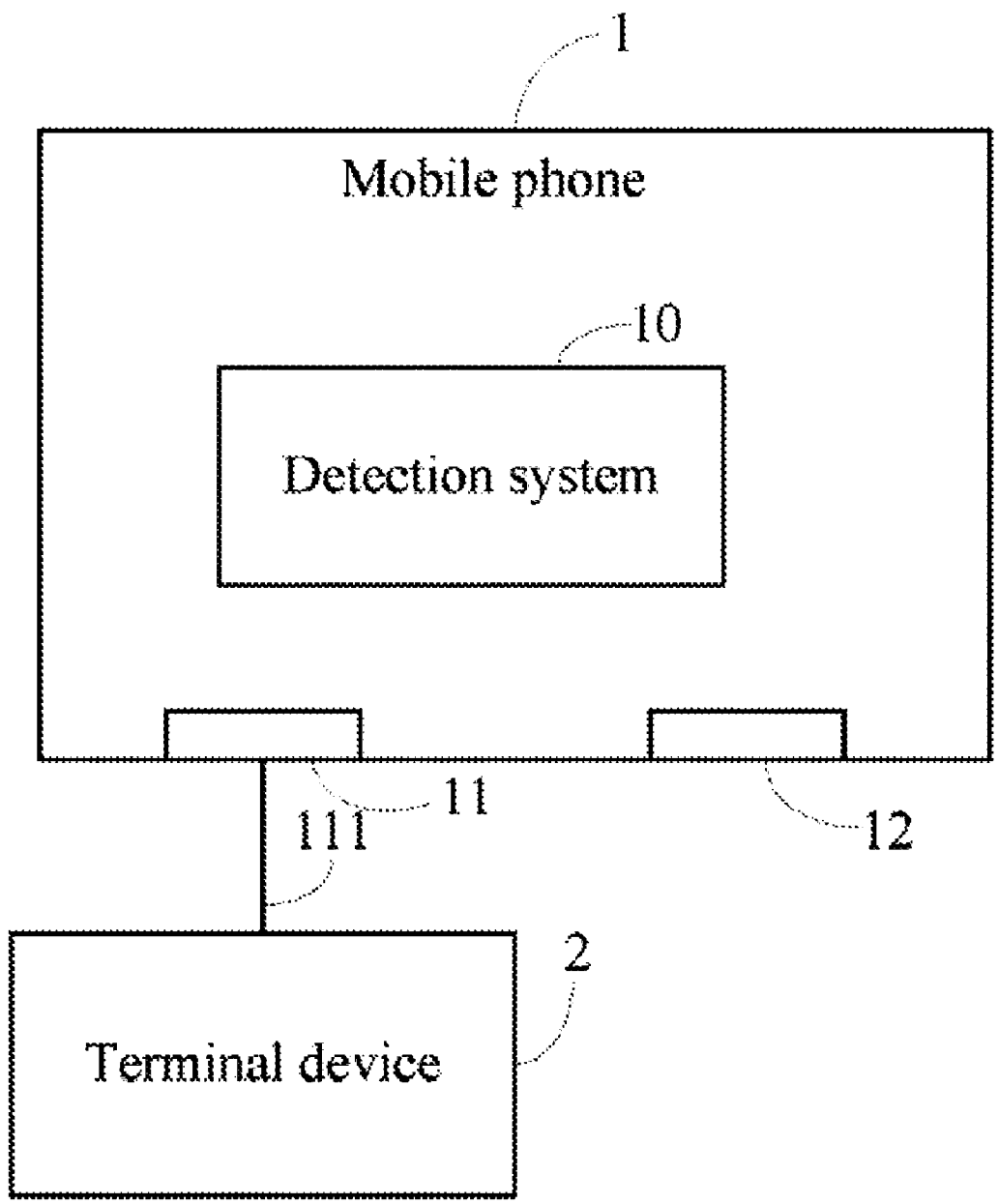
FIG. 1 is a block diagram of one embodiment of a mobile phone 1 comprising a detection system.

FIG. 1 is a block diagram of one embodiment of a mobile phone 1 comprising a detection system 10. The detection system 10 may be used to detect the status of a universal serial bus (USB) port 11 of the mobile phone 1. The USB port 11 connects to a terminal device 2 via a data cable 111. In one embodiment, the terminal device 2 may be a computer. The mobile phone 1 includes a charging interface 12. Depending on this embodiment, a voltage of the USB port 11 is the same as that of a voltage of the charging interface 12. It should be understood that the mobile phone 1 is exemplary and the disclosure may include other electronic devices utilizing a USB port without departing from the spirit of the disclosure.

Figure 2:
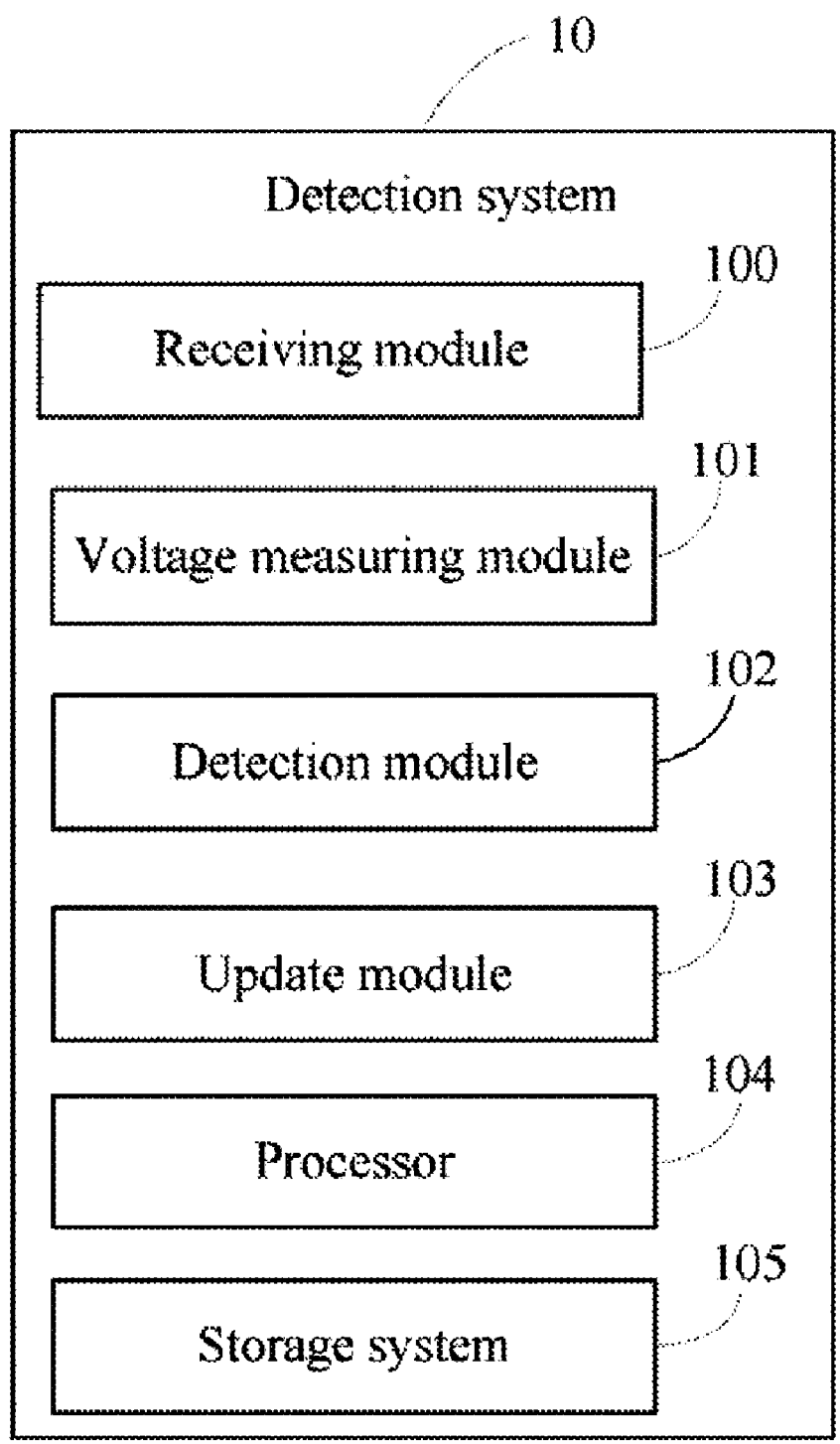
FIG. 2 is a block diagram of function modules of the detection system in FIG. 1.

FIG. 2 is a block diagram of function modules of the detection system 10 in FIG. 1. In one embodiment, the detection system 10 may include a receiving module 100, a voltage measuring module 101, a detection module 102, and an update module 103. It may be understood that one or more specialized or general purpose processors, such as a processor 104, may be used to execute one or more computerized code of the function modules 100-103. The one or more computerized code of the functional modules 100-103 may be stored in a storage system 105.

The storage system 105 stores a connection status of the USB port 11 and the terminal device 12. In one embodiment, the connection status of the USB port 11 may comprise a connecting status, a connected status, a disconnecting status, or a disconnected status. The connecting status indicates that the data cable 111 is being inserted into the terminal device 2 and the USB port 11. The connected status indicates that the USB port 11 has been inserted and data cable 111 is successfully in place. The disconnecting status indicates that the data cable 111 is being withdrawn from the USB port 11 or from the terminal device 2. The disconnected status indicates that the data cable 111 has been withdrawn completely and the USB port 11 is no longer connected to the terminal device 2.

When the terminal device 2 is connected to the USB port 11 of the mobile phone 1 by the data cable 111, the receiving module 100 receives a connection signal transmitted by the data cable 111. The connection signal indicates that the terminal device 2 has been connected to the USB port 11 by the data cable 111.

The voltage measuring module 101 measures a first voltage of the charging interface 12 after the receiving module 100 receives the connection signal.

The detection module 102 determines whether the first measured voltage of the charging interface 12 increases. If the first measured voltage of the charging interface 12 increases, the update module 103 updates the connection status stored in the storage system 105 as the connecting status.

The voltage measuring module 101 also measures a second voltage of the charging interface 12 every interval "t" after the first measured voltage increases. The first interval "t" may be, for example, 4.615 milliseconds (ms).

The detection module 102 also determines whether the second measured voltage decreases. If the second measured voltage does not decrease, the detection module 102 determines whether the second measured voltage changes during a second interval "T", which may be, for example, 0.3 second(s). If the second measured voltage does not change during the second interval "T", the update module 103 updates the connection status to the connected status.

If the second measured voltage decreases, the update module 103 updates the connection status to the disconnecting status. If the second measured voltage continues to decrease during the second interval "T" after the second measured voltage decreases, the update module 103 updates the connection status to the disconnected status.

Figure 3:
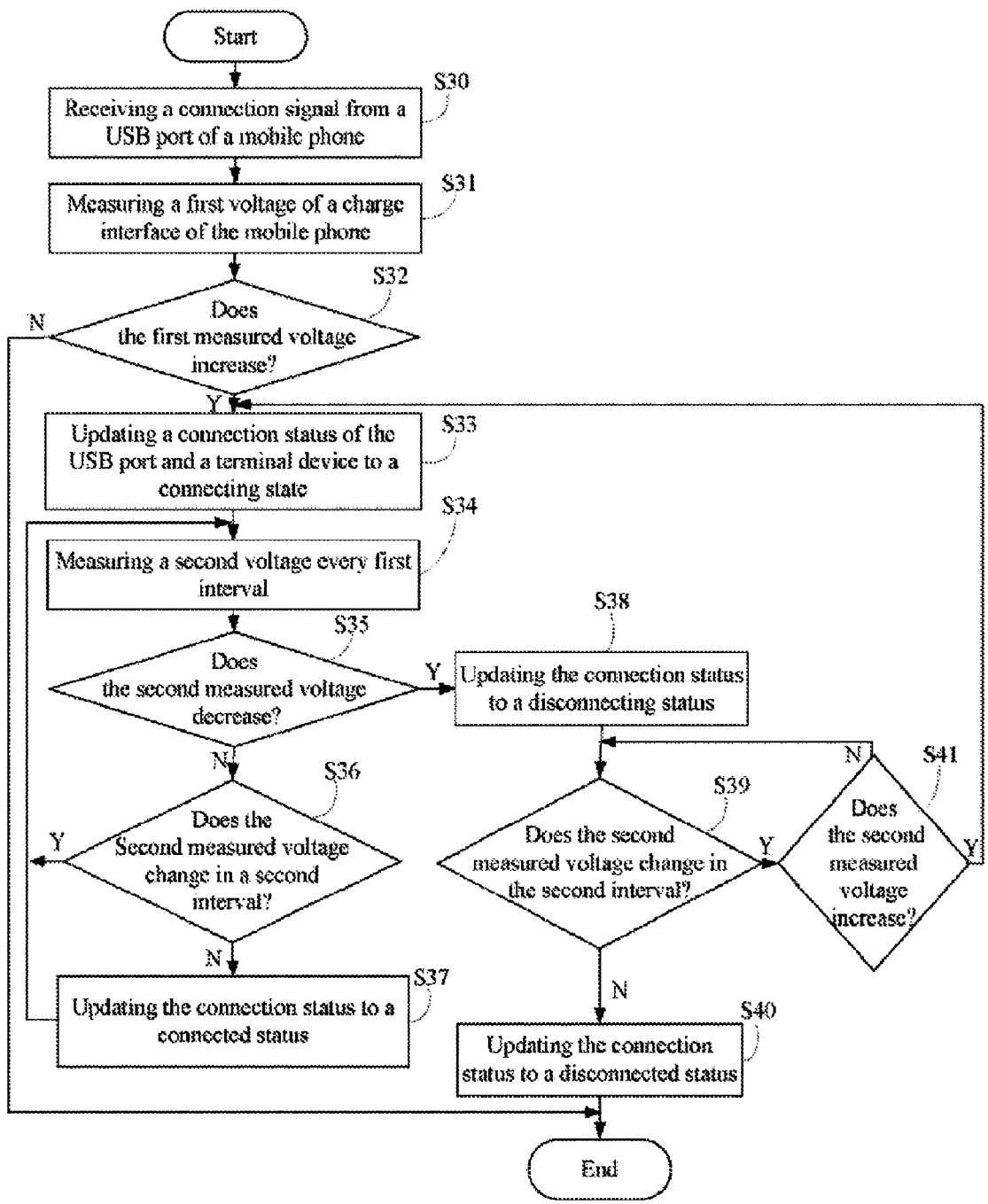
FIG. 3 is a flowchart of one embodiment of a method for detecting the status of the universal serial bus port of a mobile phone, such as, for example, that in FIG. 1.

FIG. 3 is a flowchart of one embodiment of a method for detecting the status of the USB port 11 of a mobile phone 1. Depending on the embodiment, additional blocks may be added, others removed, and the ordering of the blocks may be changed.

In block S30, the receiving module 100 receives a connection signal transmitted via the data cable 111.

In block S31, the voltage measuring module 101 measures a first voltage of the charging interface 12 after the connection signal is received.

In block S32, the detection module 102 determines whether the first measured voltage increases. If the first measured voltage does not increase, the procedure ends. If the measured voltage increases, block S33 is implemented, in which the update module 103 updates the connection status stored in the storage system 105 to the connecting status, and block S34 is implemented.

In block S34, the voltage measuring module 101 measures a second voltage of the charging interface 12 every first interval "t".

In block S35, the detection module 102 determines whether the second measured voltage decreases. If the second measured voltage does not decrease, block S36 is implemented. If the second measured voltage decreases, block S38 is implemented.

In block S36, the detection module 102 determines whether the second measured voltage changes during a second interval "T" after the first measured voltage increases. If the second measured voltage does not change, block S37 is implemented. If the second measured voltage changes, block S34 is repeated.

In block S37, the update module 103 updates the connection status to the connected status, and block S34 is repeated.

In block S38, the update module 103 updates the connection status to the disconnecting status.

In block S39, the detection module 102 determines whether the second measured voltage changes after the second measured voltage decreases. If the second measured voltage does not change, block S40 is implemented. If the second measured voltage changes, block S41 is implemented.

In block S40, the update module 103 updates the connection status to the disconnected status.

In block S41, the detection module 102 determines whether the second measured voltage increases during the second interval "T" after the second measured voltage decreases.

The disclosure allows accurate detection of the connection status of a USB port 11 of a mobile phone 1 and a terminal device 2. Connection status can appear as connecting, connected, disconnecting, and disconnected, detected by measuring the voltage of the charging interface 12. Here, voltage of the USB port 11 is the same as that of the charging interface 12. Due to stabilization of the charging interface 12, the connection status are detected accurately.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for detecting the status of a universal serial bus port (USB) of a mobile phone, the system comprising:
    at least one processor; and
    a storage unit storing a connection status of the USB port and a terminal device, and one or more programs executable by the at least one processor, the one or more programs comprising:
    a receiving module to receive a connection signal transmitted via a data cable of the USB port when the terminal device is connected to the USB port by the data cable;
    a voltage measuring module to measure a first voltage of a charging interface of the mobile phone after the connection signal is received;
    an update module to update the connection status of the USB port to connecting status if the first measured voltage of the charging interface increases;
    the voltage measuring module also to measure a second voltage of the charging interface every first interval after the first measured voltage increases; and
    the update module also to update the connection status to connected status if the second measured voltage does not change during a second interval after the first measured voltage increases, to update the connection status to disconnecting status if the second measured voltage decreases, and update the connection status to disconnected status if the second measured voltage does not change during the second interval after the second measured voltage decreases.

2. The system of claim 1, wherein a voltage of the USB port is the same as the voltage of the charging interface.

3. A method for detecting the status of a universal serial bus (USB) port of a mobile phone, the method comprising:
    (a) receiving a connection signal transmitted via a data cable of the USB port when a terminal device is connected to the USB port by the data cable;
    (b) measuring a first voltage of a charging interface of the mobile phone;
    (c) updating a connection status of the USB port and a terminal device to connecting status if the first measured voltage of the charging interface increases;
    (d) measuring a second voltage every first interval;
    (e) updating the connection status to disconnecting status if the second measured voltage decreases, and further updating the connection status to disconnected status if the second measured voltage does not change during a second interval after the second measured voltage decreases; or
    (f) detecting if the measured voltage changes during the second interval if the second measured voltage does not decrease; and
    (g) updating the connection status to connected status if the second measured voltage does not change during the second interval after the first measured voltage increases, and repeating block (d).

4. The method of claim 3, wherein block (f) further comprises: repeating block (d) if the second measuring voltage changes during the second interval.

5. The method of claim 3, wherein block (e) further comprises:
    returning to block (c) if the second measured voltage increases during the second interval.

6. The method of claim 3, wherein the voltage of the charging interface is the same as a voltage of the USB port.

7. A medium having stored therein instructions that, when executed by a mobile phone, cause the mobile phone to perform a method for detecting the status of a universal serial bus (USB) port of the mobile phone, the method comprising:
    (a) receiving a connection signal transmitted via a data cable of the USB port when a terminal device is connected to the USB port by the data cable;
    (b) measuring a first voltage of a charging interface of the mobile phone;
    (c) updating a connection status of the USB port and a terminal device to connecting status if the first measured voltage of the charging interface increases;
    (d) measuring a second voltage every first interval;
    (e) updating the connection status to disconnecting status if the second measured voltage decreases, and further updating the connection status to disconnected status if the second measured voltage does not change during a second interval after the second measured voltage decreases; or
    (f) detecting if the measured voltage changes during the second interval if the second measured voltage does not decrease; and
    (g) updating the connection status to connected status if the second measured voltage does not change during the second interval after the first measured voltage increases, and repeating block (d).

8. The medium of claim 7, wherein block (f) further comprises: repeating block (d) if the second measuring voltage changes during the second interval.

9. The medium of claim 7, wherein step (e) further comprises:
    repeating block (c) if the second measured voltage increases during the second interval.

10. The medium of claim 7, wherein the voltage of the charging interface is the same as a voltage of the USB port.

* * * * *